United States Patent [19]
Erickson et al.

[11] Patent Number: 6,114,670
[45] Date of Patent: Sep. 5, 2000

[54] NONLINEAR FEEDFORWARD CONTROL FOR RAMP FOLLOWING AND OVERSHOOT MINIMIZATION

[75] Inventors: Mark Erickson, Sunnyvale; Thorkell Gudmundsson, San Jose, both of Calif.

[73] Assignee: Voyan Technology, Santa Clara, Calif.

[21] Appl. No.: 09/345,402

[22] Filed: Jul. 1, 1999

[51] Int. Cl.[7] .............................. H05B 1/02; G05B 13/02
[52] U.S. Cl. .......................... 219/497; 219/490; 700/55; 700/44; 700/300
[58] Field of Search ..................................... 219/490, 494, 219/497, 501, 483; 708/300; 318/615, 568.22; 700/55, 44, 45, 300

[56] References Cited

U.S. PATENT DOCUMENTS

| | | | |
|---|---|---|---|
| 3,758,762 | 9/1973 | Littman et al. | 708/300 |
| 3,894,396 | 7/1975 | Durrant | 708/300 |
| 4,156,919 | 5/1979 | Constant | 708/300 |
| 5,448,147 | 9/1995 | Kasai | 318/568.17 |
| 5,488,576 | 1/1996 | Main | 708/300 |
| 5,831,949 | 11/1998 | Kim | 369/44.35 |

*Primary Examiner*—John A. Jeffery
*Attorney, Agent, or Firm*—Blakely Sokoloff Taylor & Zafman LLP

[57] ABSTRACT

The present invention includes a method and system for nonlinear feedforward control for ramp following and overshoot minimization in a plant under control. The present invention augments a feedforward system with a nonlinear compensation mechanism for minimizing the overshoot that occurs in a conventional feedforward system.

26 Claims, 4 Drawing Sheets

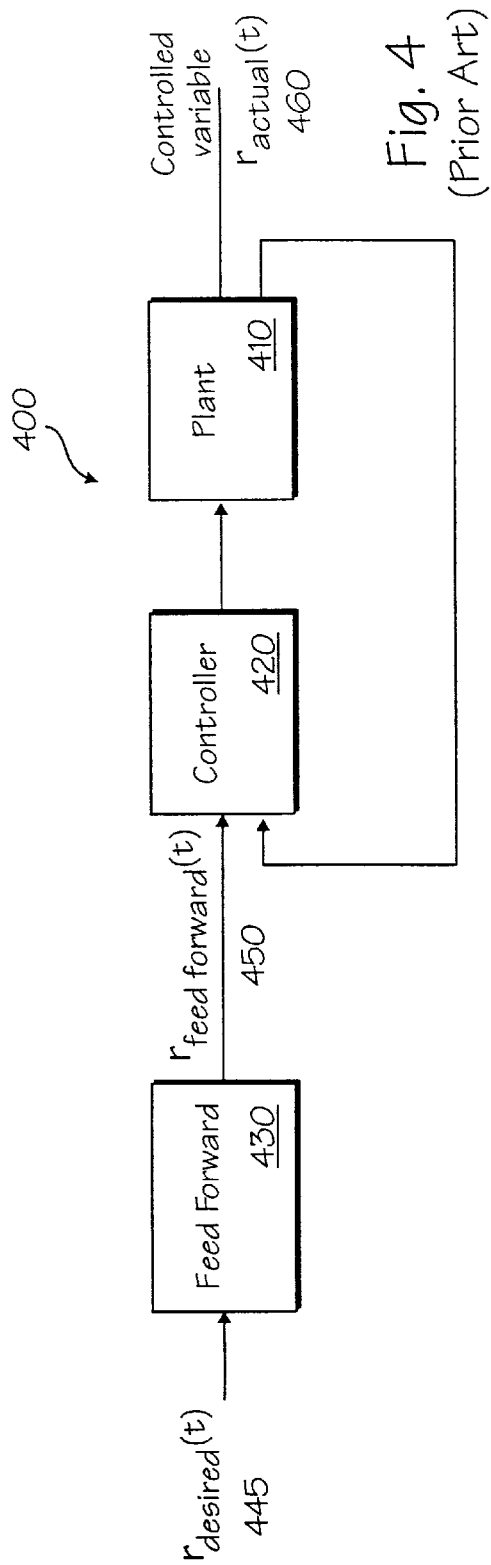
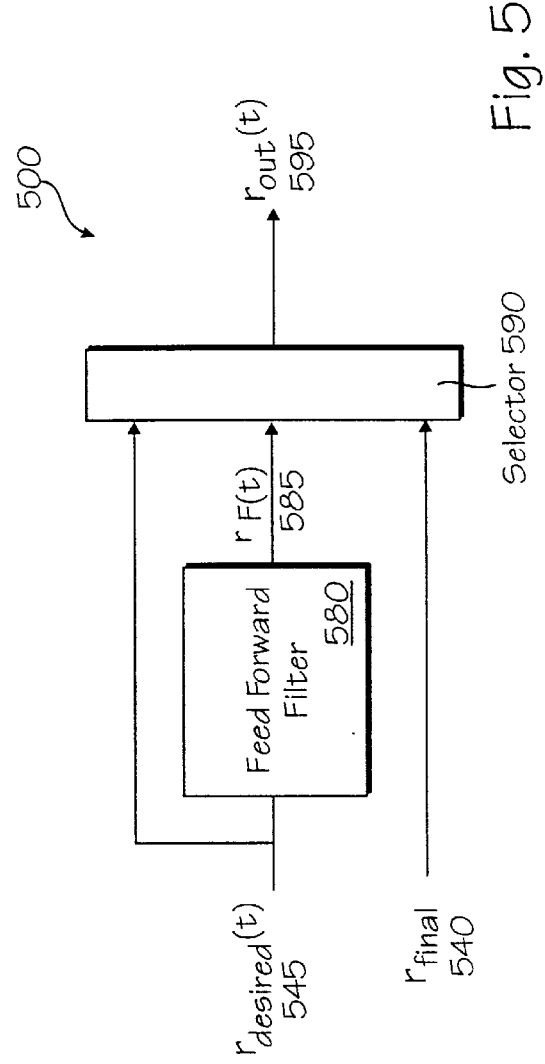

ND OVERSHOOT
NONLINEAR FEEDFORWARD CONTROL FOR RAMP FOLLOWING AND OVERSHOOT MINIMIZATION

BACKGROUND OF THE INVENTION

1. Field of the Invention

The present invention pertains to the field of controllers. More specifically, the present invention relates to controllers for ramping and stabilizing a plant at a setpoint.

2. Background Information

In control of a plant the control system attempts to ramp up and stabilize a particular variable under control to a setpoint. For many plants, linear controllers with integral action track constant setpoints asymptotically, i.e., the variable under control converges to a constant desired value. When the setpoint changes with a constant ramp rate however, linear controllers with integral action typically maintain a nonzero quasi-steady state ramping offset error.

FIG. 1 illustrates an example of a graph showing quasi-steady state offset error in a plant during ramping. Line 110 illustrates the ramping and stabilizing of the setpoint variable programmed by the user, $r_{desired}(t)$, to a final setpoint 140. However, when using a linear controller with integral action, the variable under control $r_{actual}(t)$ 130 maintains a quasi-steady state error 120 during ramping. In the example illustrated in FIG. 1, the difference between the variable under control $r_{actual}(t)$ and the setpoint variable programmed by the user $r_{desired}(t)$ has two components: a nonzero quasi-steady state offset error 150 and a zero steady-state error 160.

An example of a system exhibiting quasi-steady state offset may be a semiconductor furnace where the variable under control is the temperature of the furnace. The furnace is heated to a desired temperature (setpoint temperature) for a particular process. By using a linear controller with integral action, the actual furnace temperature converges to the desired constant setpoint asymptotically. During ramping, however, the furnace temperature lags the desired temperature by a nearly constant value (i.e., is offset).

There have been attempts to compensate for quasi-steady state offsets during ramping. One example is to increase the gain of the controller to a higher level during ramping and then decrease the gain to a lower level when the system is near the final setpoint. Increasing the feedback control gain typically reduces the size of the quasi-steady state offset during ramping. However, there are some limits to what higher gain can do for a system. When using higher gain, the system may bump into control actuator limits and reduce the performance of the controller. Additionally, a high gain controller may not always successfully stabilize the system being controlled. Further, higher gain increases the sensitivity of the system to noise (e.g., sensor and/or electrical noise). Increasing the noise sensitivity of the system and/or bumping into the control actuator may degrade the performance of the system and ultimately affect the product of the system under control.

In the semiconductor furnace example given above, the increased noise sensitivity or the limitations of the control actuator may make the control system unstable, or be unable to accurately maintain the setpoint temperature. Thus, the integrity of the process is sacrificed which may ultimately affect the reliability and performance of the semiconductor devices being manufactured.

Another attempt to compensate for quasi-steady state offset during ramping is to use feedforward control. One feedforward control method takes the ramping portion of the setpoint variable programmed by the user, $r_{desired}(t)$, and modifies it by the ramp offset error (i.e., the nonzero quasi-steady state offset error). In other words, the ramp offset error is added to the setpoint $r_{desired}(t)$ which compensates for the ramp offset error and brings the variable under control close to the original setpoint variable programmed by the user.

FIG. 2 illustrates an example of a graph showing feedforward compensation in a system during ramping. Line 210 illustrates the setpoint variable programmed by the user, $r_{desired}(t)$, to a final setpoint 240. By knowing the ramp rate offset 150 of the plant (illustrated in FIG. 1) the feedforward control mechanism modifies the portion of the setpoint variable 210 during ramping by advancing the setpoint an amount equivalent to the ramp rate offset 250 (i.e., the ramp rate offset 150 illustrated in FIG. 1) in order to bring the variable under control $r_{actual}(t)$ 220 of the system back to near the original setpoint variable programmed by the user 210. Line 220 illustrates the value of the variable under control during ramping of ramping using feedforward control. As shown in the example illustrated in FIG. 2, however, the feedforward method causes the setpoint to rise above the final setpoint 240 in a "spike" 270. This spike results in an overshoot 280 of the final setpoint 240. In many manufacturing control systems, an excessive overshoot of the final setpoint 240 of the system may affect the integrity of the system and ultimately affect the product of the system or results produced by the system.

FIG. 4 illustrates a block diagram of an example of a system 400 including feedforward control. System 400 includes plant 410 (i.e., the device under control), controller 420, and feedforward mechanism 430. The setpoint ($r_{desired}$) 445 is input into the feedforward mechanism 430, which outputs a modified value of the variable under control, $r_{feedforward}$ 450, to the controller 420. Controller 420 in turn uses $r_{feedforward}$ 450 along with measurements to control the plant. The plant produces $r_{actual}(t)$ 460 which is the actual value of the variable under control that is realized in the plant 410.

As discussed above, the use of a feedforward system 400 may result in an overshoot of the variable under control as compared to the setpoint variable programmed by the user. In the semiconductor furnace example given above, the overshoot 280 may increase the temperature level of the furnace beyond the temperature desired. This increase may result in poor process results and may even damage the semiconductor wafers being processed. Thus, the integrity of the process is degraded which may ultimately affect the reliability and performance of the semiconductor device being manufactured.

What is needed is a method and system for ramp following and overshoot minimization.

SUMMARY OF THE INVENTION

The present invention includes a method and system for nonlinear feedforward control for ramp following and overshoot minimization in a plant under control. The present invention augments a feedforward system with a nonlinear compensation mechanism for minimizing the overshoot that occurs in a conventional feedforward system.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which:

FIG. 4 illustrates a block diagram of an example of a system including feedforward control.

FIG. 5 illustrates a block diagram of a system according to one embodiment of the present invention.

DETAILED DESCRIPTION

A method and system for nonlinear feedforward control for ramp following and overshoot minimization are disclosed. In the following description, numerous specific details are set forth such as specific equipment, processes, parameters, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes a method and system for nonlinear feedforward control for ramp following and overshoot minimization in a plant under control. The present invention augments a feedforward system with a compensation mechanism for minimizing the overshoot that may occur in a conventional feedforward system.

Figure 1:
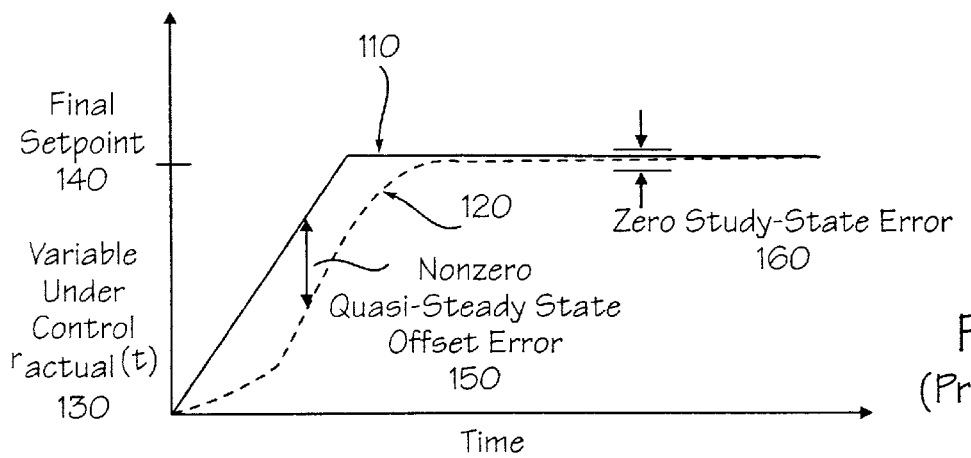
FIG. 1 illustrates an example of a graph showing quasi-steady state offset error in a plant during ramping.
Figure 3:
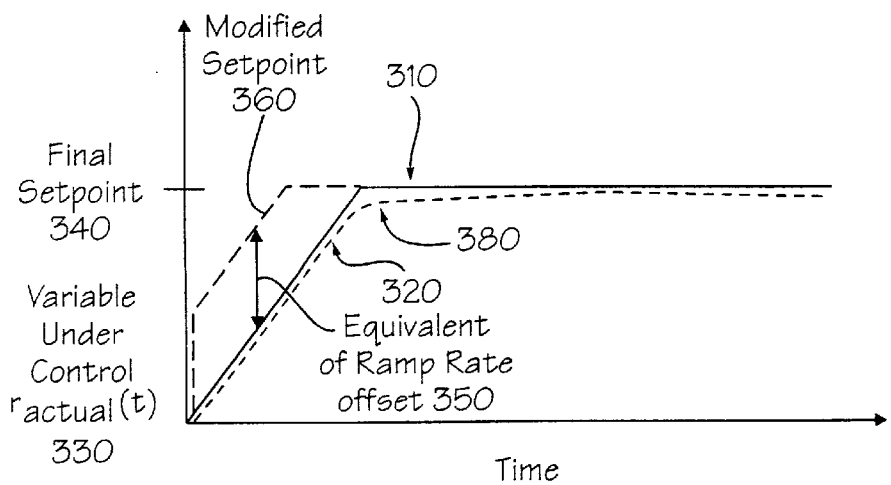
FIG. 3 illustrates an example of a graph showing compensation in a plant during ramping according to one embodiment of the present invention.

FIG. 3 illustrates an example of a graph showing compensation in a plant during ramping according to one embodiment of the present invention. Line 310 illustrates the setpoint programmed by the user $r_{desired}(t)$. Line 310 illustrates the ramping and stabilizing of the setpoint $r_{desired}(t)$ to a final setpoint 340 (i.e., a constant value). By computing an approximation to the ramp rate offset 150 of the plant (illustrated in FIG. 1) the feedforward control mechanism modifies the setpoint programmed by the user 310 by advancing the ramping portion of the setpoint an amount similar to the ramp rate offset 350 (i.e., the ramp rate offset 150 illustrated in FIG. 1) in order to bring the variable under control $r_{actual}(t)$ 320 close to the original setpoint programmed by the user $r_{desired}(t)$ 310. Line 360 illustrates the modified setpoint.

The feedforward mechanism compensates for the ramp rate offset by virtue of the fact that the steady state offset during ramping is proportional to the steepness of the ramp. In other words, the steady state offset is proportional to the derivative of the curve (or slope). The derivative of the ramp is computed to determine the steepness of the ramp and then the setpoint is modified by an amount proportional to the derivative of the ramp such that the offset that the system would have exhibited is approximately canceled out. Such a modification results in a filtered variable, $r_F(t)$.

Figure 2:
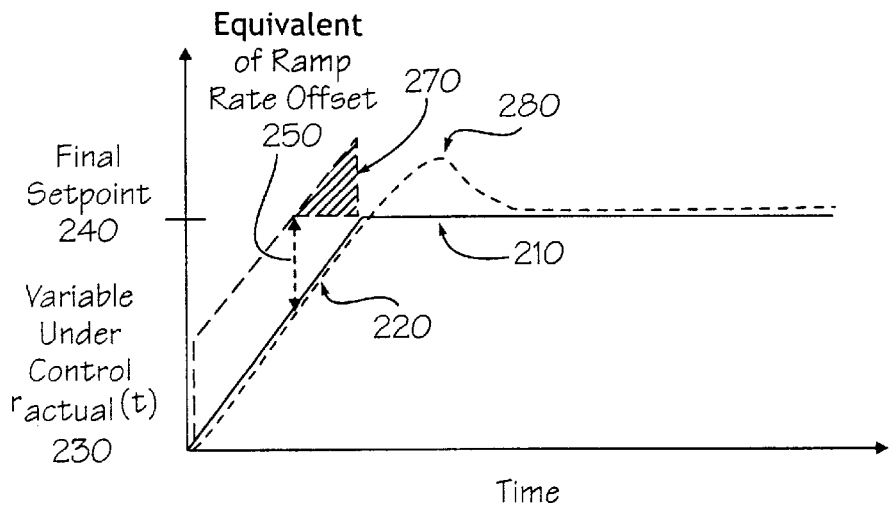
FIG. 2 illustrates an example of a graph showing feedforward compensation in a plant during ramping.

Rather than using the filtered value $r_F(t)$ for the entire ramp cycle as in conventional feedforward systems, the present invention includes a compensation mechanism that reduces the spike 270 (illustrated in FIG. 2) and minimizes the overshoot of the variable under control $r_{actual}(t)$ beyond final setpoint 340. Line 320 illustrates the variable under control during ramping using the feedforward control and compensation mechanism of the present invention. As illustrated in FIG. 3, the present invention enables the variable under control $r_{actual}(t)$ 320 to turn the corner 380 and stabilize at the final setpoint 340 with minimal (or no) overshoot.

FIG. 5 illustrates an embodiment of the system of the present invention. The system 500 includes a feedforward filter (filter) 580 and an output selector (selector) 590. The setpoint variable programmed by the user, $r_{desired}(t)$ 545, is input into the filter 580. The final setpoint, $r_{final}$ 540, the setpoint variable programmed by the user $r_{desired}(t)$ 545, and the filtered variable which is output from filter 580, $r_F(t)$ 585, are input into the selector 590. The selector 590 makes a comparison and selection and outputs a new value of the variable under control, $r_{out}(t)$ 595, that will enable the reduction of the spike 270 and overshoot 280 of the system. It should be noted that in other embodiments of the present invention, rather than selecting between signals the selector 590 may interpolate or average between the signals.

Selector 590 selects (or switches) the system output $r_{out}(t)$ 595 between $r_{final}$ 540, $r_{desired}(t)$ 545, and $r_F(t)$ 585, such that $r_{out}$ 595 will be one or the other of those values. It should be noted that selector 590 may be hardware, for example comparator and/or switch circuitry. Selector 590 may also be software, for example an if-then-else statement.

Figure 6:
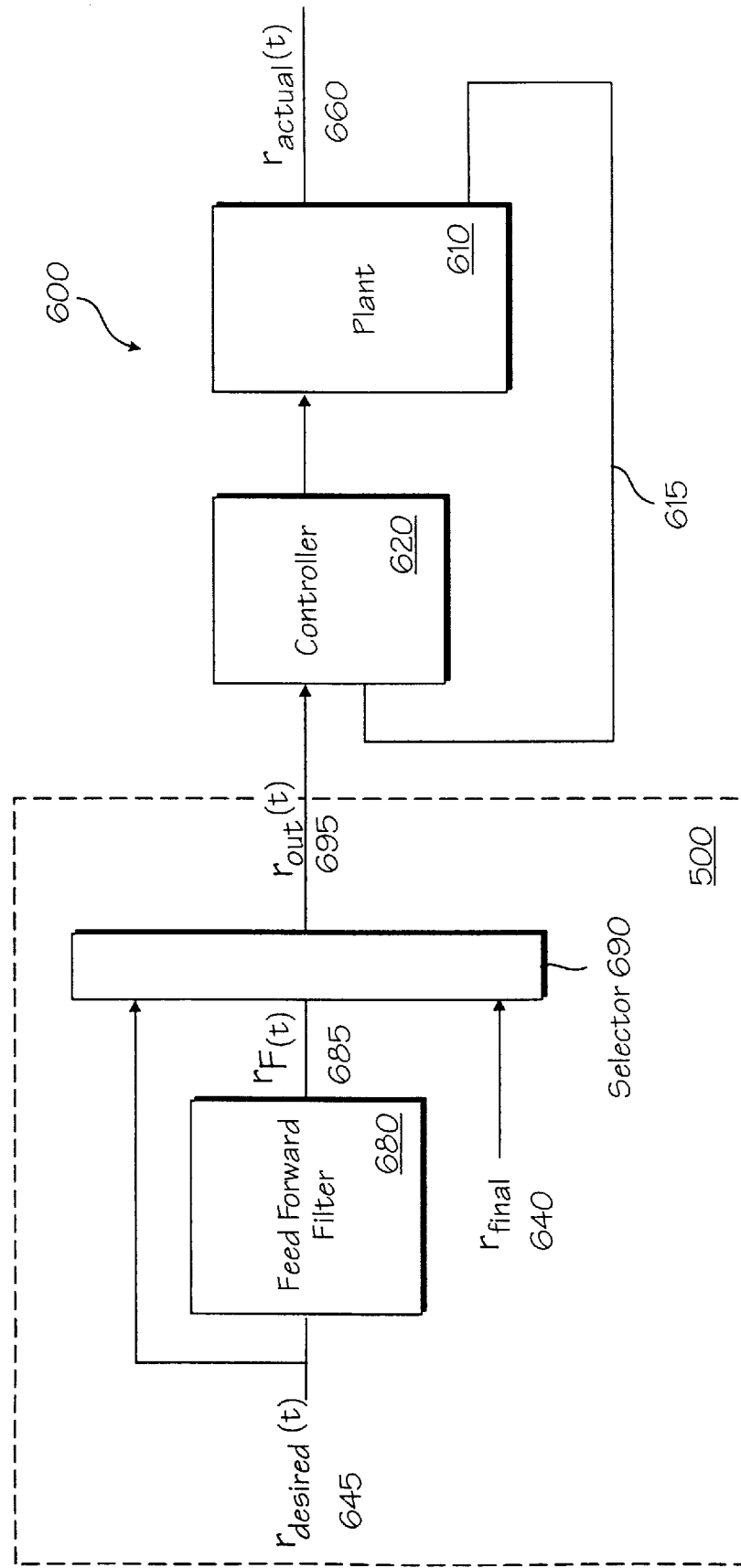
FIG. 6 illustrates a block diagram of an embodiment of the present invention incorporated into a system having a device under control.

FIG. 6 illustrates a block diagram of an embodiment of the present invention incorporated into a system having a device under control. As illustrated in FIG. 6, the system 600 includes a device under control (or plant) 610, controller 620, feedforward filter (filter) 680 and output selector (selector) 690. The setpoint variable programmed by the user, $r_{desired}(t)$ 645, is input into the filter 680. The final setpoint, $r_{final}$ 640, the setpoint variable programmed by the user, $r_{desired}(t)$ 645, and the filtered variable which is output from filter 680, $r_F(t)$ 685, are input into the selector 690. The selector 690 makes a comparison and selection (or interpolation) and then outputs a modified setpoint, $r_{out}(t)$ 695, to the controller 620. Controller 620 in turn uses $r_{out}(t)$ 695 along with measurements 615 from the plant to control the plant 610. The plant produces a new $r_{actual}(t)$ 660 which is the actual value of the variable under control that is realized in the plant 610.

Figure 7:
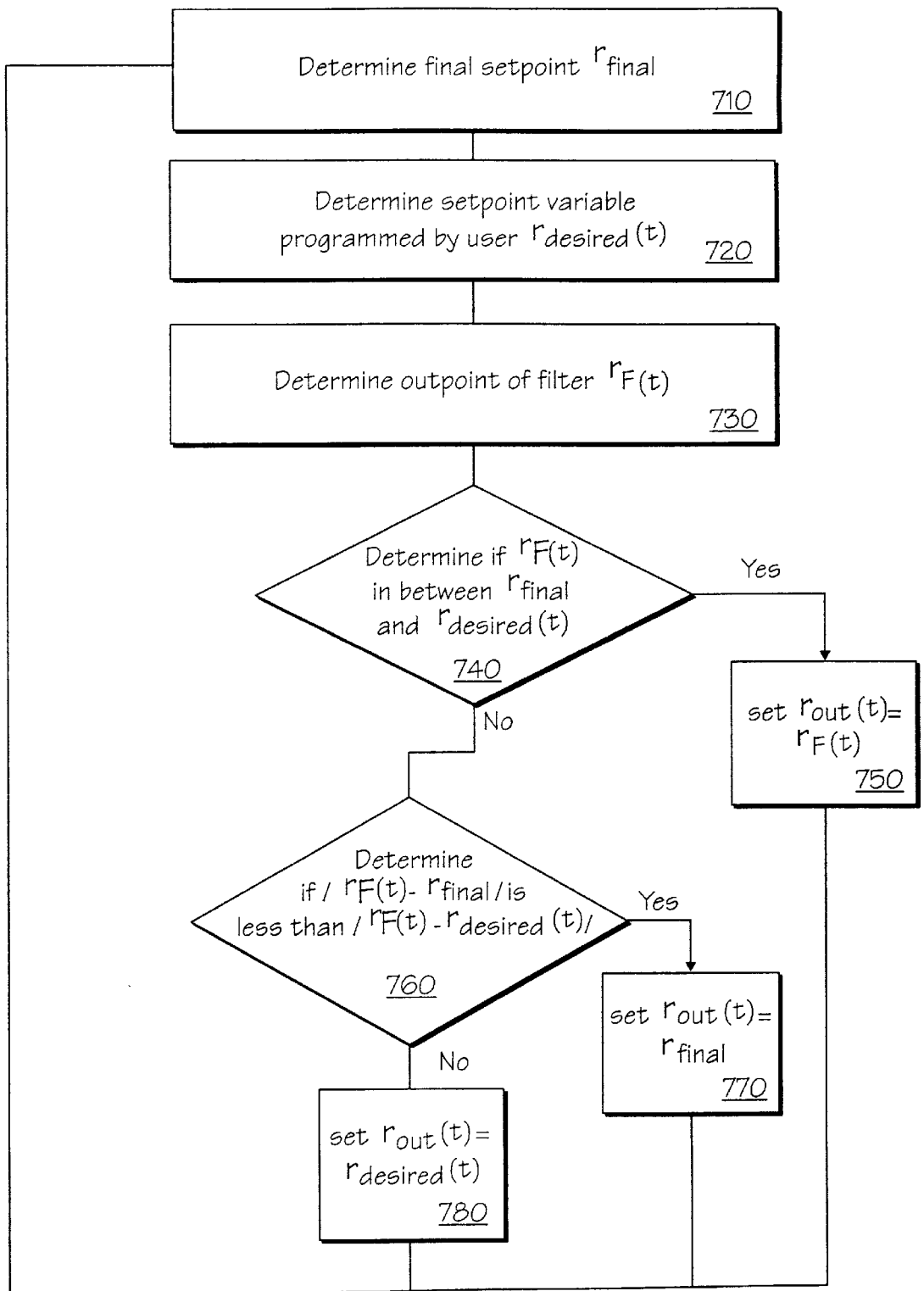
FIG. 7 illustrates a flow chart of one embodiment of the present invention.

FIG. 7 illustrates a flow chart of one embodiment of the present invention. It should be noted that the flow chart of FIG. 7 is merely meant to be demonstrative and that the steps included in the flow chart may follow many other orders and not just the order illustrated. At step 710, the final setpoint, $r_{final}$, of the plant under control is determined.

At step 720, the setpoint programmed by the user, $r_{desired}(t)$, is determined. At step 730 the filtered variable, $r_F(t)$, from the filter 680 is determined.

At step 740, it is determined if the filtered variable, $r_F(t)$, is in between the setpoint programmed by the user, $r_{desired}(t)$, and the final setpoint. If the filtered variable, $r_F(t)$, is in between the setpoint programmed by the user, $r_{desired}(t)$, and the final setpoint, $r_{final}$, then at step 750 the value of $r_{out}(t)$ is set equal to $r_F(t)$. However, if the filtered variable, $r_F(t)$, is not in between the setpoint programmed by the user, $r_{desired}(t)$, and the final setpoint, $r_{final}$, then at step 760 it is determined if the filtered variable, $r_F(t)$, is closer to the final setpoint, $r_{final}$, or the setpoint programmed by the user, $r_{desired}(t)$. If the filtered variable, $r_F(t)$, is closer to the final setpoint, $r_{final}$, than to the setpoint programmed by the user, $r_{desired}(t)$, then at step 770, $r_{out}(t)$ is set equal to $r_{final}$. Otherwise, $r_{out}(t)$ is set equal to $r_{desired}(t)$.

In one embodiment of the present invention steps 710–740 and 750 or [760 and 770 or 780] are repeated on an ongoing basis as the system operates. Thus the determination if the filtered variable, $r_F(t)$, is in between the setpoint programmed by the user, $r_{desired}(t)$, and the final setpoint, $r_{final}$, and the selection (or interpolation) between $r_F(t)$ and $r_{final}$ may be a continuous process during the operation of the system, in particular during the ramping cycle.

In another embodiment, the invention is used to precompute part or all of the output $r_{out}(t)$ at one time. This output is stored and applied to the controller 620 as the controller 620 and plant 610 operate.

It should be noted that the comparisons may be made as "in between two values" ($r_F(t)$ is between $r_{desired}(t)$ and $r_{final}$), "less than" and "greater than" two values ($r_{desired}(t) < r_F(t) < r_{final}$, if $r_{desired}(t) < r_{final}$ or $r_{desired}(t) > r_F(t) > r_{final}$, if $r_{desired}(t) > r_{final}$), "less than or equal to" and "greater than or equal to" two values ($r_{desired}(t) \leq r_F(t) \leq r_{final}$, if $r_{desired}(t) < r_{final}$ or $r_{desired}(t) \geq r_F(t) \geq r_{final}$, if $r_{desired}(t) < r_{final}$), etc. and that the embodiment described above is meant to be merely exemplary and not limiting. It should also be noted that the comparison given above is just one example of a comparison that may be made to determine which value to select for $r_{out}(t)$.

It should be noted that the operation of the above embodiment is described in the case where the ramp specified by the user $r_{desired}(t)$ has a single fixed rate (slope). The invention operates properly even if the ramp rate (slope) is not constant but rather changes with time. In an embodiment of such a case, the filter 580 can be designed to produce a filtered value $r_F(t)$ that causes the actual variable under control $r_{actual}(t)$ to remain near the ramp specified by the user $r_{desired}(t)$ even though the ramp rate (slope) changes with time.

Furthermore, although the above description describes the present invention in the case where the variable under control $r_{actual}(t)$ is ramped up from a lower to a higher value, such description is meant merely to be illustrative and not limiting. Thus it should be noted that the present invention may also apply to the case where the variable under control $r_{actual}(t)$ is ramped down from a higher to a lower value.

By switching the value of $r_{out}(t)$ between $r_F(t)$, $r_{desired}(t)$, and $r_{final}$, the present invention enables the reduction of the spike 270 and minimizes the amount of overshoot 280. Switching the value of $r_{out}(t)$ between $r_F(t)$, $r_{desired}(t)$, and $r_{final}$ using the present invention enables the variable under control 330 to ramp up to the setpoint value programmed by the user and turn the corner 380 and stabilize with minimal (if any) overshoot.

It should be noted that although the example given in the above description discusses the variable under control as being the temperature of a semiconductor furnace, the variable under control may be many other values such as pressure (for example in a semiconductor deposition chamber), velocity (for example of a car), humidity (for example in a greenhouse), position of a mechanism (for example the head of a disk drive), etc.

Additionally, it should be noted that although the above description discusses the present invention in terms of a single setpoint value, the present invention may be used in systems with more than one setpoint value. In systems with more than one setpoint variable, each of the signals ($r_{desired}(t)$, $r_{out}(t)$, etc.), is a vector at each time instance. Thus, in systems with more than one setpoint value the present invention would compensate using a vector of offset values rather than a single offset value. In such a case, the feed-forward filter 580 becomes a multi-input multi-output filter, and the selector 590 performs its action on each of the outputs of the filter 580 individually or as a group.

Thus, a method and system for nonlinear feedforward control for ramp following and overshoot minimization have been described. Although specific embodiments, including specific equipment, processes, and parameters have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A method for control comprising:
   determining a final setpoint;
   determining a setpoint programmed by a user;
   determining an output of a filter;
   determining if the output of the filter is between the setpoint programmed by a user and the final setpoint, wherein
   if the output of the filter is between setpoint programmed by a user and the final setpoint, then providing the output of the filter to a system under control; and
   if the output of the filter is not between setpoint programmed by a user and the final setpoint, then providing the closer of the final setpoint and the setpoint programmed by the user to the system under control.

2. The method of claim 1 wherein the system under control includes a plant and at least one controller.

3. The method of claim 1 wherein the steps of the method of claim 1 are repeated on an ongoing basis as the system under control operates.

4. The method of claim 1 wherein the system under control includes a semiconductor furnace and at least one controller.

5. The method of claim 1 wherein the step of determining if the output of the filter is between the setpoint programmed by a user and the final setpoint is performed using software.

6. The method of claim 1 wherein the step of determining if the output of the filter is between the setpoint programmed by a user and the final setpoint is performed using hardware.

7. The method of claim 1 wherein the step of determining if the output of the filter is between the setpoint programmed by a user and the final setpoint is performed using an output selector.

8. A system for minimizing overshoot of a final setpoint comprising:
   a feedforward filter; and
   an output selector coupled to the feedforward filter.

9. The system of claim 8 wherein a final setpoint, an setpoint programmed by a user, and an output from the feedforward filter are input into the output selector.

10. The system of claim 9 wherein the output selector comprises a mechanism for determining if the output of the filter is between setpoint programmed by a user and the final setpoint.

11. The system of claim 10 wherein the mechanism for determining if the output of the filter is between setpoint programmed by a user and the final setpoint comprises hardware.

12. The system of claim 10 wherein the mechanism for determining if the output of the filter is between the setpoint programmed by a user and the final setpoint comprises software.

13. The system of claim 10 wherein the output selector further comprises a mechanism for providing an output value of the output selector, wherein if the output of the filter is between setpoint programmed by a user and the final setpoint, then the output value of the output selector is set to the output value of the filter; and if the output of the filter is not between setpoint programmed by a user and the final setpoint, then the output value of the output selector is set to the closer of the final setpoint and the setpoint programmed by the user.

14. The system of claim 8 further comprising:

a system under control, wherein the system under control includes a plant and at least one controller.

15. The system of claim 14 wherein the plant is a semiconductor furnace.

16. The system of claim 9 wherein the variable under control is temperature.

17. The system of claim 9 wherein the final setpoint is temperature.

18. A system for reducing the overshoot of a final setpoint in a plant comprising:

a controller;

a feedforward filter;

an output selector, wherein the output selector is coupled between the feedforward filter and the controller.

19. The system of claim 18 wherein a final setpoint, setpoint programmed by a user, and an output from the feedforward filter are input into the output selector.

20. The system of claim 19 wherein the output selector comprises a mechanism for determining if the output of the filter is between the setpoint programmed by a user and the final setpoint.

21. The system of claim 20 wherein the mechanism for determining if the output of the filter is between the setpoint programmed by a user and the final setpoint comprises hardware.

22. The system of claim 20 wherein the mechanism for determining if the output of the filter is between the setpoint programmed by a user and the final setpoint comprises software.

23. The system of claim 20 wherein the output selector further comprises a mechanism for providing an output value of the output selector to the controller, wherein if the output of the filter is between the setpoint programmed by a user and the final setpoint, then the output value of the output selector is set to the output value of the filter; and if the output of the filter is not between the setpoint programmed by a user and the final setpoint, then the output value of the output selector is set to the closer of the final setpoint and the setpoint programmed by a user.

24. The system of claim 19 wherein the variable under control is temperature.

25. The system of claim 19 wherein the final setpoint is temperature.

26. The system of claim 18 wherein the plant is a semiconductor furnace.

* * * * *